(No Model.)
V. BOATWRIGHT.
APPARATUS FOR ELEVATING AND CONVEYING WATER.
No. 481,099. Patented Aug. 16, 1892.
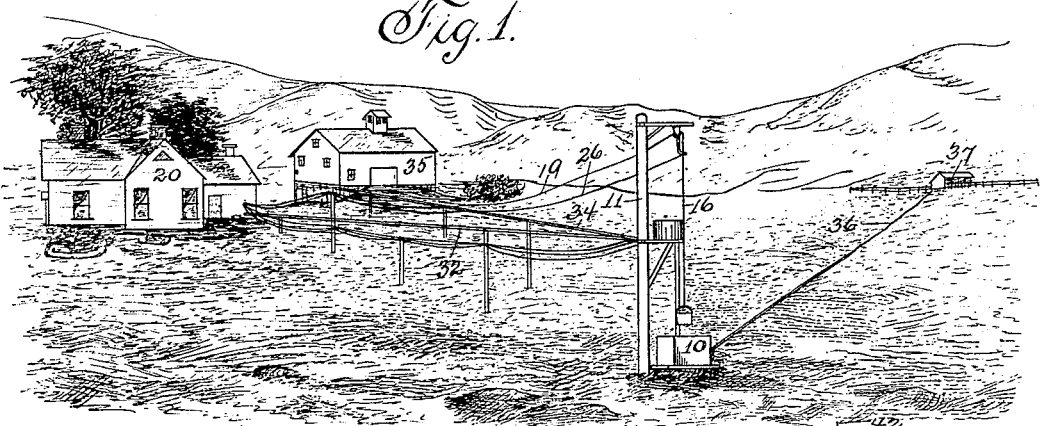
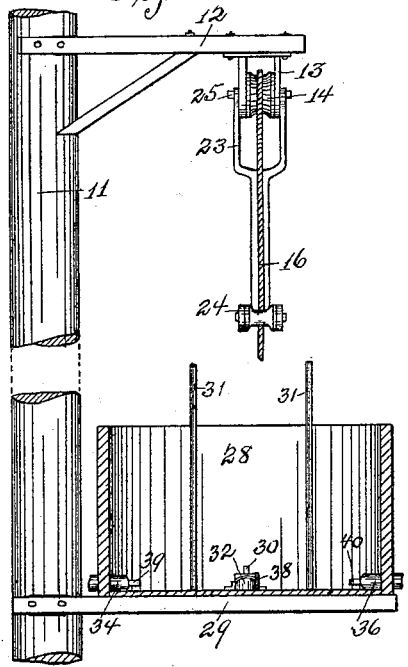
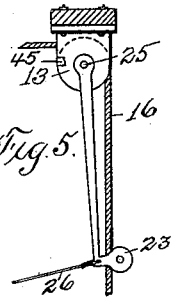
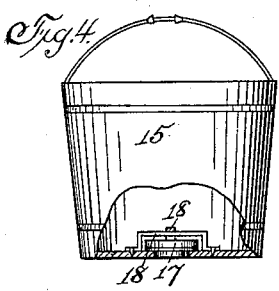
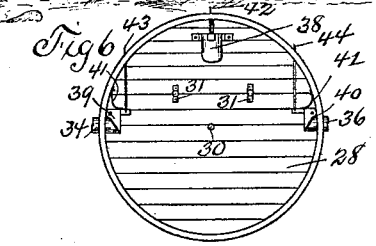
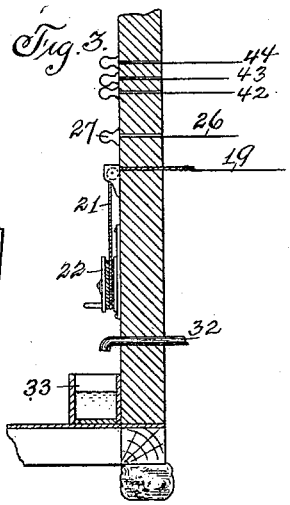
Witnesses
F. C. Tate
G. R. Green
Valentine Boatwright
by Bulkley & Sweet
his Atty's

UNITED STATES PATENT OFFICE.

VALENTINE BOATWRIGHT, OF ADEL, IOWA.

APPARATUS FOR ELEVATING AND CONVEYING WATER.

SPECIFICATION forming part of Letters Patent No. 481,099, dated August 16, 1892.

Application filed January 14, 1892. Serial No. 418,022. (No model.)

*To all whom it may concern:*

Be it known that I, VALENTINE BOATWRIGHT, a citizen of the United States, and a resident of Adel, in the county of Dallas and State of Iowa, have invented certain new and useful Improvements in Apparatus for Elevating and Conveying Water, of which the following is a specification.

My invention appertains to that class of devices in which a water-elevating apparatus located in juxtaposition to a well or other source of water-supply is operated from within a house or other apartment situate at a considerable distanc from the source of water-supply to elevate and convey the water to and within said house or apartment.

My invention has for its object, primarily, the provision of means for facilitating the operation of elevating and conveying water from a source of supply to a point distant therefrom, which means are operated from a point adjacent to the discharge of the water.

My invention has for a further object the provision of means for controlling from one point of operation the exit and discharge of the water after it is elevated to different distant points of deposit, which point of operation may be distant from the source of water-supply as well as the points of discharge.

My invention consists in the arrangement in juxtaposition to a well or other source of water-supply, of a water-elevator and receiving-tank, which elevator is actuated by mechanism operated from a point distant from the source of water-supply to raise and deposit the water in said tank, together with a conduit leading from the said tank to a point of discharge adjacent to the place from which the mechanism is operated.

My invention consists, further, in the arrangement, in juxtaposition to a well or other source of water-supply, of a receiving-tank, and a water-elevator adapted to be so operated as to raise the water and deposit the same within said tank, and a plurality of conduits having valvular appliances controlling the entrance thereto opening from said tank and leading from thence to desired points of deposit, together with mechanism manually operated at one point of operation distant from the well and elevator, whereby the elevator is actuated and controlled, as is also the valvular appliances at the ports of the conduits.

My invention consists, further, in the arrangement and conjunctive operation with the water-elevator and mechanism operating the same, of means for determining the distance of vibration of the well-bucket to either side of the well.

My invention consists, further, in independently-operated mechanisms, one serving to elevate the water and the other acting upon the elevating apparatus to determine the position of the elevating-bucket relative to a conveying-conduit, which mechanisms are operated from a common point and are under manual control.

My invention consists, further, in independent manually-operated mechanism for diverting the flow of water at will after the same has been elevated and deposited within a receiving-tank, which mechanisms are actuated from the same point as the elevating and depositing mechanisms.

My invention consists, further, in the details of construction and combination of parts hereinafter more clearly set forth, pointed out, and claimed, reference being now had to the accompanying drawings, in which—

Figure 1 is a perspective view of the complete device in operation. Fig. 2 is an enlarged detail view of the water-elevator and receiving-tank, showing, also, the valves whereby the ports of the conduits are controlled. Fig. 3 is a detail view of the actuating mechanism within the house. Fig. 4 is an enlarged detail view of a portion of the elevating-bucket, showing the valve therein. Fig. 5 is a side view of the hanger clip and sheave. Fig. 6 is a plan view of the bottom of the receiving-tank, looking downward.

In the construction of the device as shown, the numeral 10 designates a well-curb surrounding the orifice to a well or other source of water-supply, and 11 a mast firmly set in the earth at one side of said well-curb. A mast-arm 12 extends from the top of the mast 11 laterally, the outer end of said mast-arm being preferably in the central vertical plane of the well. A hanger-clip 13, having a sheave 14 pivoted therein, is secured to the under side of the outer end portion of the mast-arm 12, and a rope to which the elevating-bucket 15 is attached is run through the said hanger-clip and over the sheave 14, which rope is designated as 16. A valve 17 is mounted over a port centrally located in the bottom of the elevating-bucket 15 and is limited in its upward movement by the clips 18, secured at either end to the said bottom of the bucket and extending transversely of and above the said valve. A wire 19 is secured by one of its ends to the free end of the rope 16, and extends to a point in proximity to the house 20, where it is joined to one end of a rope 21, which latter passes through an orifice in the wall of said house and is wound upon the windlass 22, Fig. 3. A hanger 23, bifurcated at its upper end and provided with a grooved roller 24, pivotally mounted in its lower end, is pivoted upon the outer end portions of the sheave-pivot 25. An elbow-shaped bend is formed in the lower end portion of the hanger 23, and that portion of said hanger between the bend therein and the grooved roller 24 is slightly less than the radius of the sheave 14. The rope 16 is run within the space between the grooved roller 24 and the solid portion of the hanger 23. A wire 26, connnected at one end to the lower end portion of the hanger 23, extends to the house 20 through the wall thereof, and is provided with a handle 27, by means of which it is manually operated. A receiving-tank 28 is mounted upon a support 29, extended from the mast 11 between the house 20 and the curb 10, which tank is provided near its center with an upright stud 30, which stud is properly secured to the bottom of said tank and is preferably of somewhat greater length than the thickness of the bottom of the elevating-bucket 15. The receiving-tank 28 is also provided with posts or stops 31, fixed to the bottom thereof and extending above its top. A conduit 32 is fixed to and opens from that side of the tank 28 adjacent to the house 20, and is extended to and through the wall of said house to a point of discharge into a suitable containing-receptacle 33. A conduit 34 is fixed to and opens from said tank and extends to a point of discharge either within or in proximity to the barn 35. A conduit 36 is fixed to and opens from the tank 28 and is extended therefrom to a point of discharge either within or in proximity to the outbuilding 37. All of the said conduits are so arranged as that their point of discharge is below the point of entrance of the water from the tank 28. Valves 38, 39, and 40 are arranged upon the interior of the tank 28, so as to close the ports of entrance of the conduits 32, 34, and 36, respectively. The said valves are acted upon by springs 41 to normally close their respective ports, and wires manually controlled lead from each of said valves to the point of discharge of the conduit 32, which latter wires are designated, respectively, 42, 43, and 44. A lug 45 is fixed on each side of the hanger-clip 13 at a point near the periphery of said clip and in a plane below the horizontal plane of the pivot 25.

The operation of my apparatus is as follows: When it is desired to procure a supply of water in the containing-receptacle 33, the elevating-bucket 15 being in the position shown in Fig. 1, the windlass 22 is reversely rotated, unwinding the rope 21 and permitting the said bucket to descend into the water within the well. When the said bucket is filled, the windlass is rotated to wind up the rope 21 and exert a pull on the wire 19 and rope 16, thus elevating the said bucket until the bail thereof is in proximity to the lower end of the hanger 23. At this time power is exerted manually on the wire 26, drawing the hanger and elevating-bucket forward until the said hanger contacts with the lugs 45, or the said bucket engages with and is stopped by the posts 31, after which the windlass 22 is again reversely rotated to permit the elevating-bucket to descend within the tank 28. The elevating-bucket is so guided in its descent within the tank 28 by the posts 31 as that the valve 17 contacts with the stud 30 and is raised from its seat by said stud, thus permitting the water within the said bucket to escape into the said tank. At this time the wire 42 may be manually actuated to open the valve 38 and permit the water within the tank 28 to flow through the conduit 32 and be discharged into the containing-receptacle 33. The elevating-bucket 15 may be again lowered into the well by first holding or securing the wire 26 stationary, winding up the rope 21, and elevating the bucket a sufficient distance that it may swing clear of the tank 28, releasing the said wire 26 to permit the said bucket to assume a position above the well and in the vertical plane thereof and reversely rotating the windlass to permit of the descent of the bucket, as before described.

It is apparent that the process of elevating the water and depositing the same within the tank 28 may be indefinitely repeated without necessitating any delay, since the water within the said tank is drawn therefrom through the said conduit very rapidly. The valve 39 may be opened, if desired, and the water drawn off from the tank 28 to the barn 35, or by actuating the valve 40 a flow of water may be maintained to the outbuilding 37.

It is apparent that any reasonable number of conduits may be arranged to open from the tank 28 and diverge therefrom to any desired point miles distant from said tank, if desired, thus providing a supply of water at one point and distributing the same to numerous points over a farm or other portion of territory at the will and by the operation of one person at one given point of control. It is also obvious that the erection of the elevating apparatus shown and described will in no wise interfere with drawing water from the same source of supply through a pump or by means of a bucket operated by a person or power-spring motor at the well, it being my intention to provide means to avoid the necessity heretofore existing of carrying the water in a containing-vessel either by hand or over a suspended track through the space intervening between the source of supply and the point at which the water is desired for use. It will be obvious, further, that the tank 28 may be supplied with water and drawn upon at intervals, if desired, the ports of egress from said tank being entirely controlled by the valvular appliances.

Having thus described my invention, what I claim as new therein, and desire to secure by Letters Patent of the United States, is—

1. In an apparatus for elevating and conveying water, the combination, with a suitable support located in juxtaposition to a well and a tank mounted on said support, of a clip secured to and pending from said support at a point above the tank, a sheave mounted in said clip, a bifurcated hanger pivoted on said clip and depending therefrom, the lower portion of which hanger is bifurcated and bent at right angles to the main portion thereof, an anti-friction pulley mounted in said lower portion of the hanger, a rope extending over the sheave and downward through the bifurcated lower end of said hanger, and a pail secured to the end of said rope below said hanger, together with means for moving said hanger out of the normal position, whereby the said pail is brought into the vertical plane of the said tank.

2. In an apparatus for elevating and conveying water, the combination, with a suitable support located in juxtaposition to a well, of a tank mounted upon said support and provided with valves and conduits leading therefrom, wires leading from said valves to a common point outside of said tank, vertical stops or guides fixed within said tank, a bifurcated hanger pivoted to a clip mounted on said support, a rope run over a sheave pivoted in said clip, a pail suspended by said rope, a valve in the bottom of said pail, and an anti-friction roller in the bifurcated lower end of said hanger, together with means for moving said hanger out of its normal position, whereby said pail is brought into the vertical plane of said tank and caused to engage the said stops.

In testimony whereof I hereunto have set my hand this 11th day of December, 1891, at Des Moines, Iowa, in the presence of two witnesses.

VALENTINE BOATWRIGHT.

In presence of—
CHAS. C. BULKLEY,
S. C. SWEET.